United States Patent
Konya et al.

(10) Patent No.: US 7,332,144 B2
(45) Date of Patent: Feb. 19, 2008

(54) HYDROPHOBIC SILICA FINE POWDER AND MAKING METHOD

(75) Inventors: Yoshiharu Konya, Annaka (JP); Koichiro Watanabe, Annaka (JP); Susumu Ueno, Takefu (JP)

(73) Assignee: Shin - Etsu Chemical Co., Ltd., Tokyo (JP)

( * ) Notice: Subject to any disclaimer, the term of this patent is extended or adjusted under 35 U.S.C. 154(b) by 213 days.

(21) Appl. No.: 10/305,152

(22) Filed: Nov. 27, 2002

(65) Prior Publication Data

US 2003/0103890 A1  Jun. 5, 2003

(30) Foreign Application Priority Data

Nov. 30, 2001  (JP)  ............................. 2001-365554

(51) Int. Cl.
*C09C 1/30* (2006.01)
*C01B 33/18* (2006.01)

(52) U.S. Cl. ...................... 423/335; 423/336; 423/337; 106/482; 106/287.13; 524/492; 524/493

(58) Field of Classification Search ................ 423/335, 423/337, 336; 106/660, 482, 287.13; 524/492, 524/493, 261
See application file for complete search history.

(56) References Cited

U.S. PATENT DOCUMENTS

| | | | |
|---|---|---|---|
| 3,334,062 A | 8/1967 | Brown et al. | |
| 3,948,676 A | 4/1976 | Laüfer | |
| 4,418,165 A | 11/1983 | Polmanteer et al. | |
| 4,680,173 A * | 7/1987 | Burger | 424/47 |
| 5,447,676 A * | 9/1995 | Fukuda et al. | 264/331.18 |
| 5,610,230 A | 3/1997 | Yoshida et al. | |
| 5,691,097 A * | 11/1997 | Bortfeldt | 430/137.1 |
| 5,908,592 A | 6/1999 | Kimura et al. | |
| 6,103,441 A * | 8/2000 | Tomita et al. | 430/110.4 |
| 6,156,285 A * | 12/2000 | Adams et al. | 423/335 |
| 6,193,795 B1 | 2/2001 | Nargiello et al. | |
| 6,579,929 B1 | 6/2003 | Cole et al. | |
| 6,677,095 B2 * | 1/2004 | Murota et al. | 430/108.3 |
| 2004/0115142 A1* | 6/2004 | Sherwood et al. | 424/59 |

FOREIGN PATENT DOCUMENTS

| | | |
|---|---|---|
| EP | 0 637 616 A1 | 2/1995 |
| EP | 0 841 363 A1 | 5/1998 |
| WO | WO0142372 A1 * | 6/2001 |
| WO | WO 01/52618 A2 | 7/2001 |

* cited by examiner

*Primary Examiner*—Ngoc-Yen Nguyen
(74) *Attorney, Agent, or Firm*—Birch, Stewart, Kolasch & Birch, LLP

(57) ABSTRACT

A hydrophobic silica fine powder is prepared by premixing a hydrophilic silica fine powder with a dimer diol siloxane or cyclic siloxane as a hydrophobizing agent, mixing them in a ball mill for achieving dispersion and for achieving cleavage or disintegration and consolidation, and thereafter heating at 100-300° C. in an ammonia or amine-containing atmosphere. The powder has an aerated bulk density of 100-300 g/l, a specific surface area of 40-300 $m^2/g$, a primary particle diameter of 10-120 nm, and a degree of hydrophobization of 40-80 as measured by methanol titration and is less bulky, easy to handle and disperse and stable in a kneaded mixture.

15 Claims, No Drawings

HYDROPHOBIC SILICA FINE POWDER AND MAKING METHOD

This nonprovisional application claims priority under 35 U.S.C. § 119(a) on Patent Application No. 2001-365554 filed in JAPAN on Nov. 30, 2001, which is herein incorporated by reference.

This invention relates to hydrophobic silica fine powder useful as a dispersant for dispersing ingredients in cyclic or linear siloxane (i.e., organo(poly)siloxane) and/or hydrophobic organic solvent to form a wax, paint and ink or as a filler for RTV silicone compositions; and a method for preparing the same.

BACKGROUND OF THE INVENTION

Hydrophobic silica fine powder is generally produced by first forming a hydrophilic silica fine powder and treating the powder with silicon compounds having hydrophobic groups. In the most common known procedure, tetrachlorosilane in a vapor phase is subjected to high-temperature hydrolysis by an oxyhydrogen flame to form a hydrophilic silica fine powder commonly known as fumed silica. Then, hexamethyldisilazane (HMDS) or dimethyl-dichlorosilane and water are added to the fumed silica. Condensation reaction of silanol-bearing hydrophobic groups resulting from hydrolysis with silanol on the silica surface is effected at 100 to 300° C. to form siloxane bonds, whereby the silica surface is covered with hydrophobic groups. In this way, silica fine powder exhibiting hydrophobic properties is obtained.

Silica fine powder having a large specific surface area indicative of fine particles tends to partially bind through siloxane bonds to take network and dumbbell structures even when synthesized at temperatures below the melting point of silica: 1,423° C. Additionally, water which is added for hydrolysis of the treating agent used for hydrophobization of silica fine powder causes the silica fine powder to agglomerate, interfering with the dispersion of the hydrophibizing agent such as trimethylsilanol or dimethyldisilanol. In subsequent heat treatment for hydrophobization in the presence of by-products including ammonia, acid (such as hydrogen chloride) and alkali, agglomerated portions mediated with water give rise to binding of silica. This results in a bulky powder in which network and dumbbell portions are complexly entangled to define voids that remain empty and which powder is difficult to handle during storage and transportation. When the powder is dispersed in a liquid, the particles behave like coarse particles and settle down due to insufficient hydrophobization and a complex partially bound structure, resulting in poor dispersion. When such silica fine powder is added to a silicone composition and kneaded therewith, strong shear forces cause the silica bonds to be cleaved to create ionic active sites which can absorb moisture to become silanol. This undesirably brings about a viscosity rise and cure of the silicone product, detracting from shelf stability.

SUMMARY OF THE INVENTION

Therefore, an object of the invention is to provide a hydrophobic silica fine powder which is easy to handle and disperse and remains stable in a kneaded mixture, and a method for preparing the same.

The inventors have found that by premixing a hydrophilic silica fine powder obtained by hydrolysis or oxidative firing in flame of an (organo)halosilane or (organo)alkoxysilane with a hydrophobizing agent in the form of a dimer diol siloxane and/or cyclic siloxane, mixing the hydrophobizing agent with the powder in a ball-mediated mill for achieving dispersion of the hydrophobizing agent and for effecting cleavage or disintegration and consolidation, and thereafter heating at 100° C. to 300° C. in an ammonia or amine-containing atmosphere, there is obtained a hydrophobic silica fine powder having an aerated bulk density of 100 to 300 g/l, a specific surface area of 40 to 300 $m^2/g$, a primary particle diameter of 10 to 120 nm, and a degree of hydrophobization of 40 to 80 as measured by methanol titration. This hydrophobic silica fine powder has advantages including ease of handling, effective dispersion and kneaded mixture stability.

In one embodiment, the present invention provides a hydrophobic silica fine powder prepared by premixing a hydrophilic silica fine powder obtained by hydrolysis or oxidative firing in flame of an (organo)halosilane or (organo)alkoxysilane with a hydrophobizing agent in the form of a dimer diol siloxane and/or cyclic siloxane, mixing the hydrophobizing agent with the powder in a ball-mediated mill for achieving dispersion and for effecting cleavage or disintegration and consolidation, and thereafter heating at 100° C. to 300° C. in an ammonia or amine-containing atmosphere. The hydrophobic silica fine powder has an aerated bulk density of 100 to 300 g/l, a specific surface area of 40 to 300 $m^2/g$, a primary particle diameter of 10 to 120 nm, and a degree of hydrophobization of 40 to 80 as measured by methanol titration.

In another embodiment, the present invention provides a method for preparing a hydrophobic silica fine powder having the above-described properties, comprising the steps of premixing a hydrophilic silica fine powder obtained by hydrolysis or oxidative firing in flame of an (organo)halosilane or (organo)alkoxysilane with a hydrophobizing agent in the form of a dimer diol siloxane and/or cyclic siloxane; mixing the hydrophobizing agent with the powder in a ball-mediated mill for achieving dispersion and for effecting cleavage or disintegration and consolidation; and thereafter heating at 100° C. to 300° C. in an ammonia or amine-containing atmosphere.

Typically, the dimer diol siloxane is 1,3-dimethyl-1,3-bis (trimethylsiloxy)-1,3-dihydroxydisiloxane, and the cyclic siloxane is hexamethylcyclotrisiloxane or octamethylcyclotetrasiloxane. In the premixing step, $1.7 \times 10^{-6}$ to $10 \times 10^{-6}$ mol of the hydrophobizing agent is preferably added per square meter of silica surface area. The ammonia or amine-containing atmosphere is preferably established by flowing an ammonia-containing gas, adding ammonia water or adding a water-soluble amine.

DESCRIPTION OF THE PREFERRED EMBODIMENT

The hydrophobic silica fine powder of the invention is prepared by premixing a hydrophilic silica fine powder obtained by oxidative firing in flame of an (organo)halosilane or (organo)alkoxysilane with a hydrophobizing agent in the form of a dimer diol siloxane or cyclic siloxane or a mixture thereof, mixing the hydrophobizing agent with the powder in a ball-mediated mill for achieving dispersion and for effecting cleavage or disintegration and consolidation, and thereafter heating in an ammonia or amine-containing atmosphere. The dimer diol siloxane used herein is a 1,3-dihydroxy-1,1,3,3-tetraorganodisiloxane of the formula:

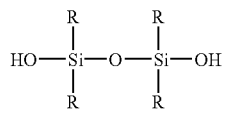

wherein R is at least one group selected from among methyl, ethyl, vinyl, trifluoropropyl, and trimethylsiloxy groups, and the number of silicon atoms per molecule is 2 to 6, preferably 2 to 4. The cyclic siloxane is typically a diorganocyclopolysiloxane having 3 to 10 silicon atoms, preferably 3 to 6 silicon atoms.

The hydrophilic silica fine powder as the starting material may be any of well-known powders including powders obtained by vapor phase hydrolysis in an oxyhydrogen flame of (organo)halosilanes, typically (organo)chlorosilanes such as tetrachlorosilane and trichloromethylsilane, and powders obtained by combustion oxidative pyrolysis of (organo) alkoxysilanes such as tetramethoxysilane, tetraethoxysilane and methyltrimethoxysilane.

The hydrophilic silica fine powder consists of hydrophilic fine particles of silica which are bulky as demonstrated by a specific surface area of 40 to 300 m²/g, an aerated bulk density of 40 to 80 g/l, and a primary particle diameter of 10 to 120 nm, and whose surface is covered with silanol. In the silica fine powder, silica particles are partially bound together to form complexly entangled network and dumbbell structures although the degree of such binding varies. If the silica fine powder in this state is subjected to hydrophobizing treatment, hydrophobic groups cannot disperse throughout the powder, resulting in uneven treatment. If network and dumbbell structures are kept as entangled, the treated silica fine powder behaves like coarse particles, depending on use conditions following the treatment, and is thus less dispersible in liquid. When the treated silica fine powder is kneaded in a silicone composition, the binding structure is broken, that is, the binds between particles are cleaved to create new active sites which cause new silanol to generate. Then the dispersed/mixed/kneaded mixture remains unstable during storage, giving rise to such troubles as viscosity increase and cure.

To overcome the above-mentioned problems, the present invention accomplishes hydrophobization by uniformly dispersing the hydrophobizing agent over silica surfaces at the same time as cleaving the binding structure between silica fine particles, then heat treating in an ammonia or amine-containing atmosphere.

The hydrophobizing agent used herein is a dimer diol siloxane having two silanol groups, which eliminates a need for hydrolysis or a cyclic siloxane having easily cleavable siloxane bonds and easily convertible to a silanol group-terminated linear siloxane, which eliminates a need for hydrolysis as well. Since the dimer diol siloxane or cyclic siloxane has or can have hydrophilic silanol groups and can directly cover silica surfaces, it does not cause agglomeration which in turn, causes increased binding and poor dispersion of the treating agent which would occur when water is combined. The treating agent is uniformly dispersed and highly compatible with silanol on the silica surface. The dimer diol siloxane has a bond distance close to that of —O—Si—O—Si—O— on the silica surface, bonds in pair with two Si atoms, assumes a stable hydrophobic structure, and provides hydrophobic groups which are free of steric hindrance as with trimethylsilyl groups, so that the amount of untreated silanol groups can be reduced. The cyclic siloxane converts to a silanol group-terminated linear siloxane whose crosslinked structure contributes to hydrophobization. Among the hydrophobizing agents, the preferred dimer diol siloxane is 1,3-dimethyl-1,3-bis(trimethylsiloxy)-1,3-dihydroxydisiloxane. The cyclic siloxanes include those of 3 to 7 monomeric units, of which trimers and tetramers, typically hexamethylcyclotrisiloxane and octamethylcyclotetrasiloxane are preferred because their siloxane bonds are most easily cleavable to form a stable hydrophobizing structure.

It is known that silanol is present on the silica surface in an amount of about $2.5 \times 10^{18}$ groups or about $4 \times 10^{-6}$ mol per square meter. With regard to the amount of the hydrophobizing agent added, too less may leave more silanol groups on the silica surface untreated and achieve insufficient hydrophobization, whereas too much may achieve no further enhancement of the hydrophobizing effect and increase the cost. For this reason, the dimer diol siloxane or cyclic siloxane which has or can have 2 mol of silanol per mol is desirably added in an amount of $1.7 \times 10^{-6}$ to $10 \times 10^{-6}$ mol, more desirably $2.0 \times 10^{-6}$ to $8.0 \times 10^{-6}$ mol per square meter of silica surface area. It is noted that the silica surface area A is calculated according to $A = W \times Sp$ wherein W is a silica weight (g) and Sp is a specific surface area (m²/g).

When the hydrophobizing agent in the form of a dimer diol siloxane or cyclic siloxane or a mixture thereof is added to the hydrophilic silica fine powder, it is recommended to premix the hydrophobizing agent with the silica fine powder by adding the hydrophobizing agent directly to the silica fine powder if the agent is liquid, or by adding or spraying a solution of the hydrophobizing agent in a solvent such as acetone, methanol, ethanol, toluene or xylene to the silica fine powder if the agent is solid, while the silica fine powder is being agitated in a powder mixer such as a Henschel mixer, Loedige mixer or Nauta mixer. The silica fine powder premix is then subjected to mixing, cleavage or disintegration and consolidation utilizing compression and shearing actions of a ball mediated mill. Suitable ball mediated mills used herein are dry continuous or batch mills including ball mills, tube mills, vibratory mills, media agitating mills, and bead mills. The balls and mill inner wall are preferably made of ceramics such as alumina, zirconia and silicon nitride for hardness and preventing introduction of abraded material. The milling time or residence time in the mill is desirably 5 minutes to 1 hour, more desirably 10 to 40 minutes. During the milling operation, silica binds in network and dumbbell structures are cleaved or disintegrated whereby voids are filled, promoting consolidation, and at the same time, the liquid hydrophobizing agent is uniformly dispersed and attached to surfaces of silica fine particles. The consolidated silica fine powder having the dimer diol siloxane or cyclic siloxane uniformly dispersed as the hydrophobizing agent is then heated as hydrophobizing treatment.

The hydrophobizing treatment is to effect condensation of silanol on the silica surface with silanol on the hydrophobizing agent in the presence of ammonia or amine. The heat treating temperature is preferably 100 to 300° C., and especially 100 to 200° C. The treating time at the temperature is desirably 30 minutes to 2 hours, and especially 30 minutes to 1 hour. The apparatus used for heat treatment is a mixer, fluidized bed or dryer which can be indirectly heated with steam or a heating medium. Illustrative of the mixer are Henschel mixers, Loedige mixers and Nauta mixers, and a paddle dryer is an exemplary dryer. They may be either batchwise or continuous.

Condensation reaction of silanol is promoted in the presence of ammonia. The silica fine powder is held in an ammonia atmosphere, for example, by introducing ammonia-containing gas into the heat treating apparatus, adding ammonia water, or adding a water-soluble amine such as triethylamine or hydroxylamine. In the method of introducing ammonia-containing gas into the heat treating apparatus, a mixture of ammonia and an inert gas may be introduced, or ammonia gas and an inert gas be separately introduced. The inert gas may be nitrogen gas, argon gas or helium gas, with the nitrogen gas being preferred for cost. The concentration of ammonia gas in the atmosphere within the heat treating apparatus is desirably 1 to 30% by volume, and more desirably 3 to 20% by volume, because too low a concentration is insufficient to promote the condensation reaction whereas too high a concentration is wasteful on account of the concentration effect being saturated and increases the burden of exhaust gas disposal. For the method of adding ammonia water to the heat treating apparatus, conc. ammonia water having a concentration of about 28% is desirable. The amount of conc. ammonia water added is desirably 1 to 20 parts and more desirably 2 to 15 parts by weight per 100 parts by weight of the silica fine powder admixed with hydrophobizing agent, because too small an amount is insufficient to promote the condensation reaction whereas too large an amount is uneconomical on account of the plateau of condensation reaction and increases the burden of exhaust gas disposal. In the method of adding a water-soluble amine such as triethylamine or hydroxylamine, the amount of water-soluble amine added is desirably 0.1 to 3 gram-mol and more desirably 0.2 to 2 gram-mol per kilogram of the silica fine powder admixed with hydrophobizing agent. The addition of ammonia water or water-soluble amine may be conducted by either dropwise addition or spraying, and preferably by spraying.

The silica fine powder which has been heat treated and hydrophobized in this way is cooled and recovered. There is obtained a hydrophobic silica fine powder having an aerated bulk density of 100 to 300 g/l, desirably 150 to 250 g/l, a specific surface area of 40 to 300 $m^2/g$, desirably 60 to 270 $m^2/g$ as expressed by BET specific surface area by the nitrogen adsorption method, a primary particle diameter of 10 to 120 nm, desirably 10 to 100 nm, and a degree of hydrophobization of 40 to 80, desirably 45 to 77, as measured by methanol titration. It is noted that the measurement of aerated bulk density and degree of hydrophobization is described later.

EXAMPLE

Examples and Comparative Examples are given below for illustrating the invention, but the invention is not limited thereto.

Example 1

The hydrophilic silica fine powder used was a fumed silica obtained by vapor phase hydrolysis in oxyhydrogen flame of tetrachlorosilane and having a BET specific surface area of 200 $m^2/g$, a primary particle diameter of 15 nm as measured under a transmission electron microscope (TEM), and an aerated bulk density of 45 g/l. The silica fine powder, 1.0 kg, was placed in a Henschel mixer having an internal volume of 75 liters. With agitation at 800 rpm, 180 g of 1,3-dimethyl-1,3-bis(trimethylsiloxy)-1,3-dihydroxydisiloxane was sprayed to the powder, which was premixed for 3 minutes. The premixed silica fine powder was transferred to a 30-liter ball mill lined with alumina and charged with alumina balls having a diameter of 20 mm, where the powder was milled at 65 rpm for 30 minutes, yielding a silica fine powder having an aerated bulk density of 170 g/l in which the hydrophobizing agent was uniformly mixed and dispersed. The milled silica fine powder, 1.1 kg, was placed in a Loedige mixer Model M20 having an internal volume of 20 liters where the powder was agitated and mixed at room temperature while a gas mixture of 10 vol % ammonia and nitrogen gas was flowed. At the same time, indirect heating with a heating medium was carried out so that the powder was held at a temperature of 160° C. for 30 minutes. Subsequent cooling yielded a hydrophobic silica fine powder. This hydrophobic silica fine powder had an aerated bulk density of 190 g/l, a specific surface area of 180 $m^2/g$, a primary particle diameter of 15 nm, and a degree of hydrophobization of 76 as measured by methanol titration. Using the powder as a filler, an RTV silicone composition was compounded and finished as a product. The composition remained stable without undergoing an increase of viscosity with time.

Example 2

The hydrophilic silica fine powder used was a fumed silica obtained by vapor phase hydrolysis in oxyhydrogen flame of tetrachlorosilane and having a BET specific surface area of 130 $m^2/g$, a primary particle diameter of 20 nm, and an aerated bulk density of 50 g/l. As in Example 1, 140 g of 1,3-dimethyl-1,3-bis(trimethylsiloxy)-1,3-dihydroxydisiloxane was sprayed to 1.0 kg of the silica fine powder, which was premixed in a Henschel mixer. The premixed silica fine powder, 1.1 kg, was transferred to a 30-liter ball mill where the powder was milled for 35 minutes, yielding a silica fine powder having an aerated bulk density of 200 g/l in which the hydrophobizing agent was mixed and dispersed. The milled silica fine powder, 1.1 kg, was placed in a Loedige mixer Model M20 where the powder was agitated and mixed at 200 rpm and room temperature while 50 g of 28% ammonia water was sprayed. Thereafter, indirect heating with a heating medium was carried out so that the powder was held at a temperature of 150° C. for 30 minutes. Subsequent cooling yielded a hydrophobic silica fine powder. This hydrophobic silica fine powder had an aerated bulk density of 220 g/l, a specific surface area of 110 $m^2/g$, a primary particle diameter of 20 nm, and a degree of hydrophobization of 74 as measured by methanol titration. An RTV silicone composition compounded using the powder as a filler as in Example 1 kept a constant viscosity.

Example 3

A spherical silica fine powder obtained by oxidative combustion in LPG-oxygen flame of tetramethoxysilane had a BET specific surface area of 65 $m^2/g$, a primary particle diameter of 40 to 100 nm, and an aerated bulk density of 80 g/l. As in Example 1, 180 g of 1,3-dimethyl-1,3-bis(trimethylsiloxy)-1,3-dihydroxydisiloxane was sprayed to 1.8 kg of the silica fine powder, which was premixed in a Henschel mixer. The premixed silica fine powder, 1.9 kg, was transferred to a 30-liter ball mill where the powder was milled for 20 minutes, yielding a silica fine powder having an aerated bulk density of 210 g/l in which the hydrophobizing agent was mixed and dispersed. The milled silica fine powder, 1.9 kg, was placed in a Loedige mixer Model M20 where the powder was agitated and mixed at 200 rpm and room temperature while 100 g of 28% ammonia water was sprayed. Thereafter, indirect heating with a heating medium was carried out so that the powder was held at a temperature of 150° C. for 20 minutes. Subsequent cooling yielded a hydrophobic silica fine powder. This hydrophobic silica fine powder had an aerated bulk density of 230 g/l, a specific surface area of 55 m$^2$/g, a primary particle diameter of 40 to 90 nm, and a degree of hydrophobization of 71 as measured by methanol titration. Using a ultra-high speed mixing system T.K. Robomics® (Tokushu Kika Kogyo Co., Ltd.), the fine powder, 15% by weight, was dispersed in decamethylcyclopentasiloxane to form a liquid, from which no particles settled out over one week, indicating good dispersion.

Example 4

The hydrophilic silica fine powder was a fumed silica having a BET specific surface area of 200 m$^2$/g, a primary particle diameter of 15 nm, and an aerated bulk density of 45 g/l as used in Example 1. The silica fine powder, 1.0 kg, was placed in a Henschel mixer having an internal volume of 75 liters. With agitation at 800 rpm, 200 g of a mixed solution of 100 g of hexamethylcyclotrisiloxane and 100 g of toluene was sprayed to the powder, which was premixed for 3 minutes. The premixed silica fine powder was transferred to a 30-liter ball mill lined with alumina, where the powder was milled at 65 rpm for 30 minutes, yielding a silica fine powder having an aerated bulk density of 170 g/l in which the hydrophobizing agent was uniformly mixed and dispersed. The milled silica fine powder, 1.1 kg, was placed in a Loedige mixer Model M20 having an internal volume of 20 liters where the powder was agitated and mixed at room temperature while a gas mixture of 10 vol % ammonia and nitrogen gas was flowed. At the same time, the mixer was heated so that the powder was held at a temperature of 170° C. for 40 minutes. Subsequent cooling yielded a hydrophobic silica fine powder. This hydrophobic silica fine powder had an aerated bulk density of 180 g/l, a specific surface area of 180 m$^2$/g, a primary particle diameter of 15 nm, and a degree of hydrophobization of 48 as measured by methanol titration. Using the powder as a filler, an RTV silicone composition was compounded and finished as a product. The composition remained stable without undergoing an increase of viscosity with time.

Example 5

The procedure of Example 1 was repeated except that 50 g of triethylamine was sprayed instead of flowing a gas mixture of 10 vol % ammonia and nitrogen gas. The resulting hydrophobic silica fine powder had an aerated bulk density of 190 g/l, a specific surface area of 175 m$^2$/g, a primary particle diameter of 15 nm, and a degree of hydrophobization of 72 as measured by methanol titration. Using the powder as a filler, an RTV silicone composition was compounded and finished as a product. The composition remained stable without undergoing an increase of viscosity with time.

Comparative Example 1

The hydrophilic silica fine powder was a fumed silica obtained by vapor phase hydrolysis in oxyhydrogen flame of tetrachlorosilane and having a BET specific surface area of 200 m2/g, a primary particle diameter of 15 nm, and an aerated bulk density of 45 g/l as used in Example 1. The silica fine powder, 500 g, was fed to a Loedige mixer Model M20 where the powder was agitated at 200 rpm and room temperature while 50 g of distilled water was sprayed. The powder was mixed for 10 minutes, after which 50 g of hexamethyldisilazane (HMDS) was sprayed. Indirect heating with a heating medium was carried out so that the powder was held at a temperature of 150° C. for 30 minutes. Subsequent cooling and recovery yielded a hydrophobic silica fine powder. This hydrophobic silica fine powder was highly bulky as demonstrated by an aerated bulk density of 55 g/l, a specific surface area of 150 m$^2$/g, and a primary particle diameter of 15 nm. An observation under TEM revealed that particles were partially bound to form complex network and dumbbell structures. The degree of hydrophobization was 60 as measured by methanol titration. Using the powder as a filler, an RTV silicone composition was compounded and finished as a product. The composition underwent an increase of viscosity with time, indicating instability.

<Measurement of Aerated Bulk Density>

The tester used is Multi-Tester MT-1000 (Seishin Enterprise Co., Ltd.). A funnel, a sieve (opening diameter 150 μm) and a spacer are stacked at the top of a feeder unit and secured by a stop. A 100-ml cell is set on a sample station. A sample is admitted into a sample unit, and the feeder is vibrated whereby the sample falls down from the sieve to fill up the cell. The sample fill is leveled off with a leveling blade. The aerated bulk density $\rho_a$ (g/ml) is calculated according to the equation:

$$\rho_a = (W_1 - W_0)/100$$

wherein $W_0$ is the weight (g) of the cell container and $W_1$ is the weight (g) of the cell container filled with the sample.

<Measurement of Degree of Hydrophobization>

In a 200-ml beaker, 50 ml of distilled water is contained and 0.2 g of treated silica is added. The contents are stirred with a magnetic stirrer. With the distal end of a buret filled with methanol being introduced in the liquid and with stirring, methanol is added dropwise until hydrophobic silica is completely dispersed in water. The degree of hydrophobization is calculated according to the equation:

$$\text{degree of hydrophobization} = [Y/(50+Y)] \times 100$$

wherein Y is the amount (ml) of methanol added.

There has been described a hydrophobic silica fine powder which is less bulky, easy to handle and disperse and remains stable in a kneaded mixture.

Japanese Patent Application No. 2001-365554 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A hydrophobic silica fine powder prepared by
   I. hydrolysis or oxidative firing in a flame of an (organo)halosilane or (organo)alkoxysilane to produce a hydrophilic silica fine powder;
   II. premixing the hydrophilic silica fine powder with a hydrophobizing agent in the form of a dimer diol siloxane which is a 1,3-dihydroxy-1,1,3,3-tetraorganodisiloxane of the following formula:

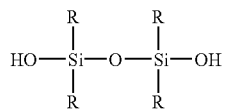

wherein R is at least one group independently selected from the group consisting of methyl, ethyl, vinyl, trifluoropropyl, and trimethylsiloxy groups, and the number of silicon atoms per molecule is from 2 to 6;

III. mixing the hydrophobizing agent with the powder in a ball-mediated mill for the intended purpose of achieving dispersion and for effecting cleavage or disintegration and consolidation; and thereafter IV. heating at 100° C. to 300° C. in an ammonia or amine-containing atmosphere, to form a silica fine powder having —O—Si—O—Si—O— structure on the surface thereof, which is formed with the dimer diol siloxane through hydrolysis condensation of silanol on the dimer diol siloxane with silanol on the surface of the hydrophilic silica fine powder; and wherein the hydrophobic silica fine powder has the following properties:

an aerated bulk density of 190 to 250 g/l;
a specific surface area of 60 to 300 m²/g;
a primary particle diameter of 10 to 120 nm;
a degree of hydrophobization of 71 to 80 as measured by methanol titration; and
remaining stable in compositions without undergoing an increase of viscosity with time when the hydrophobic silica fine powder is used as a material for RTV silicone compositions; and wherein the hydrophobic silica fine powder has the following surface structure on a part of the surface of the silica fine powder:

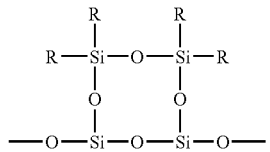

wherein R is defined as above.

2. The hydrophobic silica fine powder of claim 1 wherein the dimer diol siloxane is 1,3-dimethyl-1,3-bis(trimethylsiloxy)-1,3-dihydroxydisiloxane.

3. The hydrophobic silica fine powder of claim 1 wherein R in the formula of the dimer diol siloxane is at least one group independently selected from the group consisting of methyl, ethyl, vinyl and trifluoropropyl groups, and the number of silicon atoms per molecule is 2.

4. The hydrophobic silica fine powder of claim 1 wherein the heating is conducted at 100° C. to 200° C.

5. The hydrophobic silica fine powder of claim 1 wherein the heating is conducted for a period of from 30 minutes to two hours.

6. The hydrophobic silica fine powder of claim 1 wherein the atmosphere is one of ammonia.

7. The hydrophobic silica fine powder of claim 1 wherein the atmosphere is one of a gas mixture comprising ammonia and an inert gas.

8. The hydrophobic silica fine powder of claim 1 wherein the atmosphere is one of a gas mixture comprising ammonia and an inert gas wherein the ammonia comprises 1 to 30% by volume of the gas mixture.

9. The hydrophobic silica fine powder of claim 1 having a specific surface area of 60 to 270 m²/g.

10. The hydrophobic silica fine powder of claim 1 having a primary particle diameter of 10 to 100 nm.

11. The hydrophobic silica fine powder of claim 1 having a degree of hydrophobization of 45 to 77, as measured by methanol titration.

12. A wax comprising a hydrophobic silica fine powder prepared by

I. hydrolysis or oxidative firing in a flame of an (organo)halosilane or (organo)alkoxysilane to produce a hydrophilic silica fine powder;

II. premixing the hydrophilic silica fine powder with a hydrophobizing agent in the form of a dimer diol siloxane which is a 1,3-dihydroxy-1,1,3,3-tetraorganodisiloxane of the following formula:

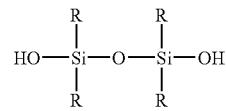

wherein R is at least one group independently selected from the group consisting of methyl, ethyl, vinyl, trifluoropropyl, and trimethylsiloxy groups, and the number of silicon atoms per molecule is from 2 to 6;

III. mixing the hydrophobizing agent with the powder in a ball-mediated mill for the intended purpose of achieving dispersion and for effecting cleavage or disintegration and consolidation; and thereafter IV. heating at 100° C. to 300° C. in an ammonia or amine-containing atmosphere, to form a silica fine powder having —O—Si—O—Si—O— structure on the surface thereof, which is formed with the dimer diol siloxane through hydrolysis condensation of silanol on the dimer diol siloxane with silanol on the surface of the hydrophilic silica fine powder; and wherein the hydrophobic silica fine powder has the following properties:

an aerated bulk density of 190 to 250 g/l;
a specific surface area of 60 to 300 m²/g;
a primary particle diameter of 10 to 120 nm;
a degree of hydrophobization of 71 to 80 as measured by methanol titration; and
remaining stable in compositions without undergoing an increase of viscosity with time when the hydrophobic silica fine powder is used as a material for RTV silicone compositions; and wherein the hydrophobic silica fine powder has the following surface structure on a part of the surface of the silica fine powder:

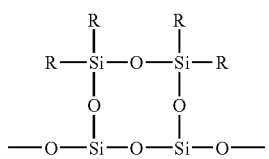

wherein R is defined as above as a dispersant in organo(poly)siloxane and/or hydrophobic organic solvent.

13. A paint comprising a hydrophobic silica fine powder prepared by
- I. hydrolysis or oxidative firing in a flame of an (organo) halosilane or (organo)alkoxysilane to produce a hydrophilic silica fine powder;
- II. premixing the hydrophilic silica fine powder with a hydrophobizing agent in the form of a dimer diol siloxane which is a 1,3-dihydroxy-1,1,3,3-tetraorganodisiloxane of the following formula:

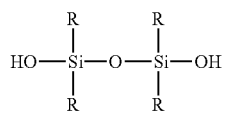

wherein R is at least one group independently selected from the group consisting of methyl, ethyl, vinyl, trifluoropropyl, and trimethylsiloxy groups, and the number of silicon atoms per molecule is from 2 to 6;
- III. mixing the hydrophobizing agent with the powder in a ball-mediated mill for the intended purpose of achieving dispersion and for effecting cleavage or disintegration and consolidation; and thereafter
- IV. heating at 100° C. to 300° C. in an ammonia or amine-containing atmosphere, to form a silica fine powder having —O—Si—O—Si—O— structure on the surface thereof, which is formed with the dimer diol siloxane through hydrolysis condensation of silanol on the dimer diol siloxane with silanol on the surface of the hydrophilic silica fine powder; and wherein the hydrophobic silica fine powder has the following properties:
- an aerated bulk density of 190 to 250 g/l;
- a specific surface area of 60 to 300 $m^2/g$;
- a primary particle diameter of 10 to 120 nm;
- a degree of hydrophobization of 71 to 80 as measured by methanol titration; and
- remaining stable in compositions without undergoing an increase of viscosity with time when the hydrophobic silica fine powder is used as a material for RTV silicone compositions; and wherein the hydrophobic silica fine powder has the following surface structure on a part of the surface of the silica fine powder:

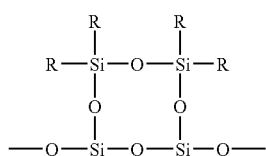

wherein R is defined as above as a dispersant in organo (poly)siloxane and/or hydrophobic organic solvent.

14. An ink comprising a hydrophobic silica fine powder prepared by
- I. hydrolysis or oxidative firing in a flame of an (organo) halosilane or (organo)alkoxysilane to produce a hydrophilic silica fine powder;
- II. premixing the hydrophilic silica fine powder with a hydrophobizing agent in the form of a dimer diol siloxane which is a 1,3-dihydroxy-1,1,3,3-tetraorganodisiloxane of the following formula:

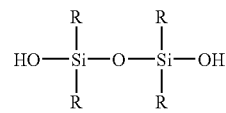

wherein R is at least one group independently selected from the group consisting of methyl, ethyl, vinyl, trifluoropropyl, and trimethylsiloxy groups, and the number of silicon atoms per molecule is from 2 to 6;
- III. mixing the hydrophobizing agent with the powder in a ball-mediated mill for the intended purpose of achieving dispersion and for effecting cleavage or disintegration and consolidation; and thereafter
- IV. heating at 100° C. to 300° C. in an ammonia or amine-containing atmosphere, to form a silica fine powder having —O—Si—O—Si—O— structure on the surface thereof, which is formed with the dimer diol siloxane through hydrolysis condensation of silanol on the dimer diol siloxane with silanol on the surface of the hydrophilic silica fine powder; and wherein the hydrophobic silica fine powder has the following properties:
- an aerated bulk density of 190 to 250 g/l;
- a specific surface area of 60 to 300 $m^2/g$;
- a primary particle diameter of 10 to 120 nm;
- a degree of hydrophobization of 71 to 80 as measured by methanol titration; and
- remaining stable in compositions without undergoing an increase of viscosity with time when the hydrophobic silica fine powder is used as a material for RTV silicone compositions; and wherein the hydrophobic silica fine powder has the following surface structure on a part of the surface of the silica fine powder:

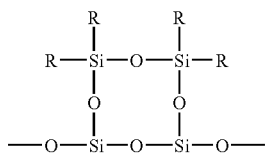

wherein R is defined as above as a dispersant in organo (poly)siloxane and/or hydrophobic organic solvent.

15. An RTV silicone composition comprising a hydrophobic silica fine powder prepared by
- I. hydrolysis or oxidative firing in a flame of an (organo) halosilane or (organo)alkoxysilane to produce a hydrophilic silica fine powder;
- II. premixing the hydrophilic silica fine powder with a hydrophobizing agent in the form of a dimer diol siloxane which is a 1,3-dihydroxy-1,1,3,3-tetraorganodisiloxane of the following formula:

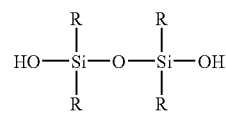

wherein R is at least one group independently selected from the group consisting of methyl, ethyl, vinyl, trifluoropropyl, and trimethylsiloxy groups, and the number of silicon atoms per molecule is from 2 to 6;

III. mixing the hydrophobizing agent with the powder in a ball-mediated mill for the intended purpose of achieving dispersion and for effecting cleavage or disintegration and consolidation; and thereafter IV. heating at 100° C. to 300° C. in an ammonia or amine-containing atmosphere, to form a silica fine powder having —O—Si—O—Si—O— structure on the surface thereof, which is formed with the dimer diol siloxane through hydrolysis condensation of silanol on the dimer diol siloxane with silanol on the surface of the hydrophilic silica fine powder; and wherein the hydrophobic silica fine powder has the following properties:

an aerated bulk density of 190 to 250 g/l;
a specific surface area of 60 to 300 m$^2$/g;
a primary particle diameter of 10 to 120 nm;
a degree of hydrophobization of 71 to 80 as measured by methanol titration; and remaining stable in compositions without undergoing an increase of viscosity with time when the hydrophobic silica fine powder is used as a material for RTV silicone compositions; and wherein the hydrophobic silica fine powder has the following surface structure on a part of the surface of the silica fine powder:

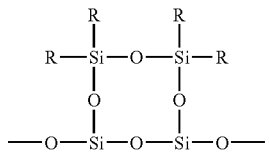

wherein R is defined as above as a filler in a silicone composition.

* * * * *